United States Patent [19]

McSherry

[11] Patent Number: 5,752,792
[45] Date of Patent: May 19, 1998

[54] ANCHOR INSERT

[75] Inventor: Thomas W. McSherry, Temple, Pa.

[73] Assignee: Cobra Anchors Co. Ltd., Montreal, Canada

[21] Appl. No.: 702,860

[22] Filed: Aug. 26, 1996

Related U.S. Application Data

[63] Continuation of Ser. No. 344,823, Nov. 23, 1994, abandoned, which is a continuation-in-part of Ser. No. 234,482, Apr. 28, 1994, Pat. No. 5,536,121, which is a continuation-in-part of Ser. No. 153,374, Nov. 16, 1993, Pat. No. 5,529,449, which is a continuation-in-part of Ser. No. 965,735, Oct. 23, 1992, Pat. No. 5,308,203, which is a continuation-in-part of Ser. No. 949,425, Sep. 22, 1992, abandoned.

[51] Int. Cl.$^6$ ........................................................ E02B 3/06
[52] U.S. Cl. ........................................... 411/31; 411/387
[58] Field of Search .............................. 411/31, 387, 29, 411/30, 178, 386, 399, 395, 424

[56] References Cited

U.S. PATENT DOCUMENTS

| 126,366 | 4/1872 | Wills | 411/387 |
|---|---|---|---|
| 4,601,625 | 7/1986 | Ernst et al. | 411/387 |
| 5,160,225 | 11/1992 | Chern | 411/387 X |
| 5,234,299 | 8/1993 | Giannuzzi | 411/387 X |

FOREIGN PATENT DOCUMENTS

| 1225529 | 9/1966 | Germany | 411/395 |
|---|---|---|---|
| 2341 | of 1858 | United Kingdom | 411/387 |
| 231155 | 6/1925 | United Kingdom | 411/387 |

*Primary Examiner*—Rodney M. Lindsey
*Attorney, Agent, or Firm*—Nolte, Nolte and Hunter, P.C.

[57] ABSTRACT

A self centering and drilling wall anchor having an outwardly threaded cylindrical body with a flanged proximal end and a cutting distal end. The distal end has a pointed tip at the long axis of said anchor and is formed with a flute extending from the pointed tip to and communicating with a through bore in the cylindrical body. The flute is defined at its outer edges by a leading cutting edge and a trailing edge, with the leading cutting edge extending radially and proximally from the pointed tip in a plane in common with the axis of the anchor and diverging from the trailing edge to provide access to the flute and the through bore for receiving material cut from the wall by the leading cutting edge.

1 Claim, 3 Drawing Sheets

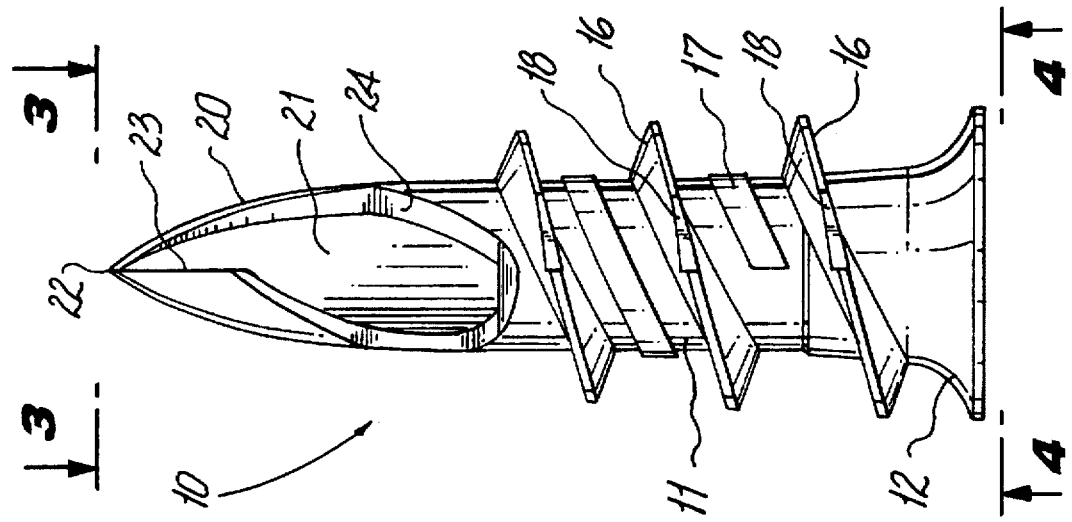
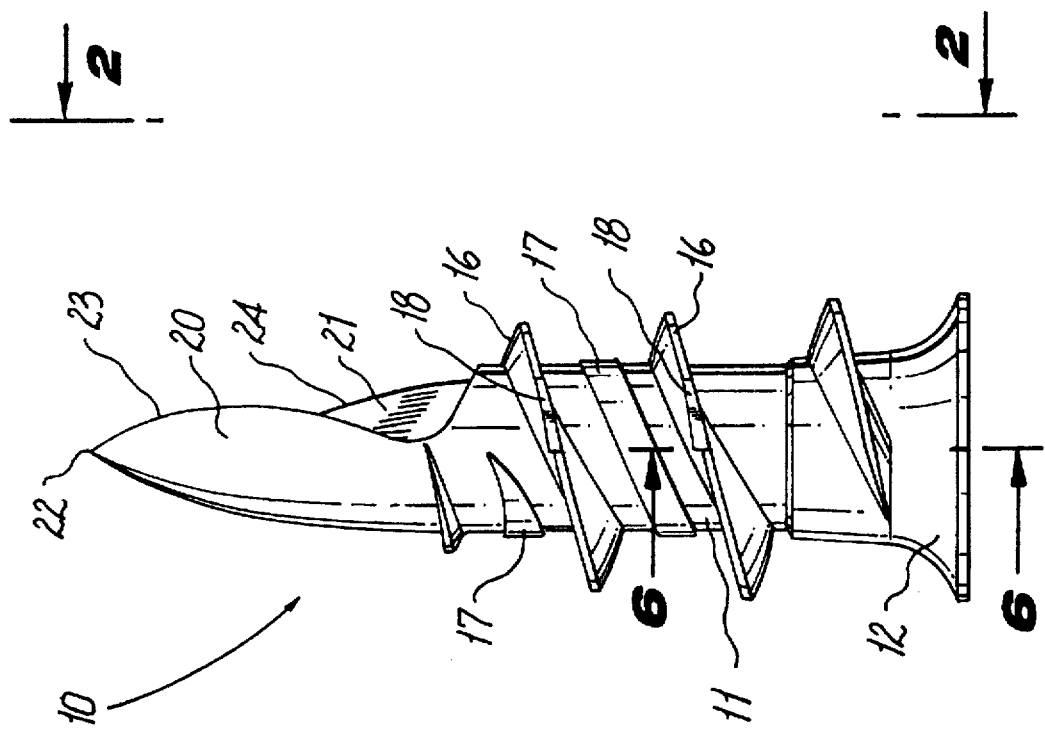

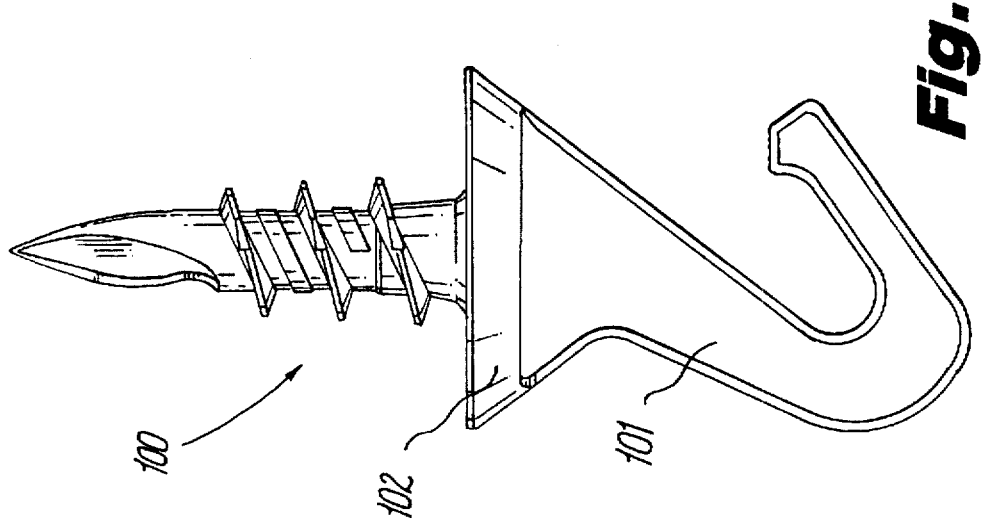
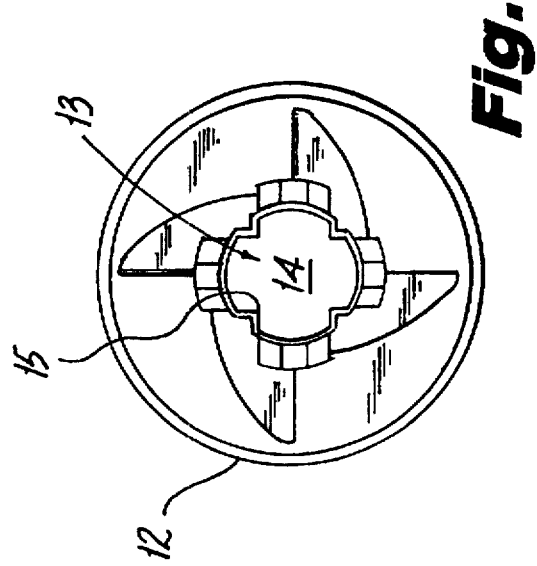
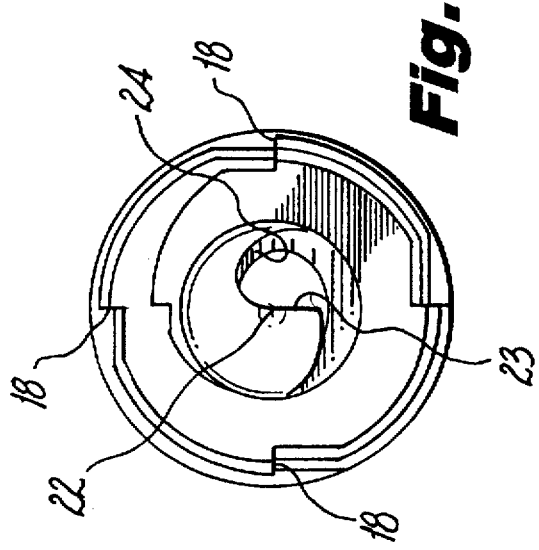

5,752,792

ANCHOR INSERT

This is a continuation of application Ser. No. 08/344,823 filed Nov. 23, 1994, claiming priority from that application and any of its parent applications.

This application is a continuation of application Ser. No. 08/344,823, filed Nov. 23, 1994 now abandoned which is a continuation-in-part of application Ser. No. 08/234,482 filed Apr. 28, 1994 now U.S. Pat. No. 5,536,121 which is a continuation-in-part of application Ser. No. 08/153,374 filed Nov. 16, 1993 now U.S. Pat. No. 5,529,449 which is a continuation-in-part of pending application Ser. No. 07/965,735 filed Oct. 23, 1992, now U.S. Pat. No. 5,308,203 issued May 3, 1994 which was a continuation-in-part of application Ser. No. 07/949,425 filed Sep. 22, 1992, now abandoned.

BACKGROUND OF THE INVENTION

This invention relates to wall anchors for securing a support fastener and particularly to a cylindrical wall anchor with an outer thread for threading into wall material such as dry wall, sheet rock and wood comprising the surface material of a hollow wall or similar structure.

In U.S. Pat. No. 5,308,203 and in the aforementioned prior applications, the distal or cutting end of the anchor is constructed to provide a circular cut in the wall in advance of the outer threads as the distal end of the anchor is press-turned into the wall. The anchors disclosed in U.S. Pat. No. 5,308,203 have through bores extending from the flanged end of the anchor to the open cutting end where opposed saw teeth extend from the periphery. The open end provides access to the bore for wall material that is displaced by the sawing action of the teeth as the anchor is rotated and pressed into the wall. The threads which preferably extend and diminish in size from the flanged end to closely adjacent the teeth act to assist in drawing the anchor through the wall as do the threads of a screw when rotated into material.

In application Ser. No. 08/234,482, incorporated herein by reference, hollow cylindrical anchors are disclosed which provide centering points at their distal ends. In one instance a flat arrow shaped drill bit straddles the open distal end of the anchor. In another instance, a centering finger extends from the inner surface of the bore adjacent a single cutter which extends from the periphery of the open end. In yet another instance the single cutter extending from the periphery of the anchor is formed as a cowl with the tip brought to the anchor's axis.

While these anchors with centering points work well, to center the cutting end of the anchor and to leave an open area to receive the material dislodged from the wall by the cutter into the bore, it has been determined that a cutter fashioned after a drill bit of a fluted construction is a preferable centering device. The problem, however, which presents itself is if such a drill bit is incorporated in an anchor of this type, access to the bore for the dislodged material is lost, and a purely drilling operation would then push the drilled material axially to explode from the inner surface of the hollow wall or jamb the anchor in a solid wall.

THE INVENTION

The present invention provides a single tip, fluted drill like cutter at the distal end of the anchor. It extends integrally from the outwardly threaded, hollow, cylindrical proximal end of the anchor with its tip at the axis of the anchor and its flute extending inwardly and proximally from the tip to communicate with the bore of the proximal end. The flute, which now provides access to the bore of the anchor for the material being dislodged from the wall, is defined at its outer lateral edges by leading and trailing edges. Because of the direction I have given the flute, I have made the leading edge more of a sawing and cutting edge than a drilling edge, and to this end, it extends radially and proximally from the tip in a plane in common with the axis of the anchor and then diverges from the trailing edge in a spiral path to meet the entering end of the thread of the proximal end of the anchor.

As fully disclosed in my prior applications including Ser. No. 234,482 filed Apr. 28, 1994 now U.S. Pat. No. 5,536,121 and as best seen herein in FIGS. 1, 2 and 6, the outer thread has a high turn adjacent the flange so that wall material is compressed between them. Thus further distal movement of the anchor is resisted when the flange and turn are embedded in the wall when a screw fastener is tapping the splines in the through bore.

In this last respect, the axial length of the cutting end of the anchor need not be coextensive with the width of the wall in which it is inserted, because the threaded end of the anchor is designed to thread into the wall material. The lead or axial thrust and rotation speed of the cutting end does not affect the lead of the threaded end of the anchor because the height of crest of the entering end of the thread is sufficiently low to enter the wall material without mutilating it. Preferably, the crest of the thread increases from the entry end to the flange of the anchor to provide a wedging action between the wall material and the root of the anchor threads.

Furthermore, it is recommended to use screws that are coextensive with the threaded proximal end. Longer screws after threading through the splines on the inner surface of the bore of the anchor will dislocate or bend the cutting end as the tip of the screw hits the converging surface of the flute, if the anchor is made of nylon or polypropylene or of other plastics or mixtures thereof. The longer screw will be inhibited from moving axially when its tip hits the converging surface of the flute, if the anchor is made of zinc, for instance.

DESCRIPTION OF THE DRAWINGS

FIG. 1 is a side plan view of the anchor of the invention;

FIG. 2 is a front plan view if the anchor of FIG. 1 taken along the line 2—2 in FIG. 1;

FIG. 3 is a top plan view of the anchor of FIGS. 1–2 taken along the line 3—3 of FIG. 2;

FIG. 4 is a bottom plan view of the anchor of FIGS. 1–3 taken along the line 4—4 in FIG. 2; and FIG. 5 is a side plan view of a hook incorporating the anchor of the invention to screw it into and support it in a wall and the like;

DETAILED DESCRIPTION OF THE ANCHORS OF THE DRAWINGS

Figure 7:
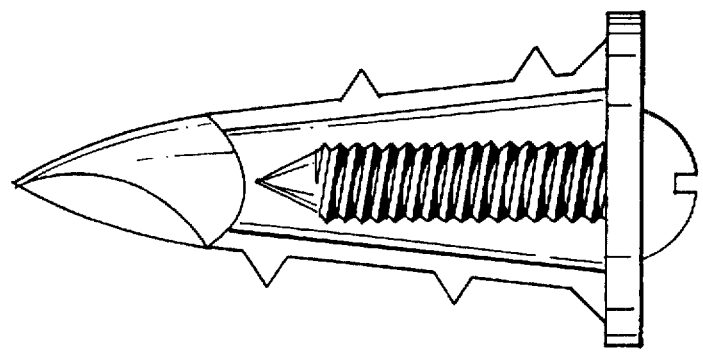
FIG. 7 is a diagrammatic showing of a screw inserted in the proximal end of an anchor not extending in the flute.
Figure 6:
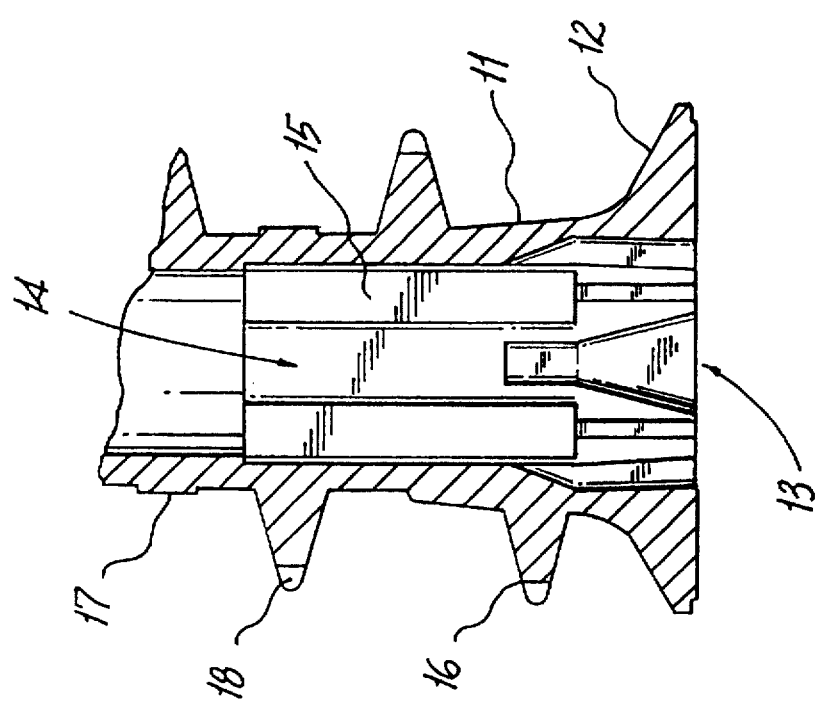
FIG. 6 is a sectional view taken along line 6—6 of FIG. 1.

The anchor insert 10 comprises a generally cylindrical proximal end 11 with an enlarged flanged end 12 providing a torque producing tool receptor opening 13 which communicates, along the axis of the anchor, with through bore 14. Bore 14 extends uninterruptedly along the axis of the anchor from the receptor opening to the flute 21 of cutter tip 20, with which the bore communicates.

Splines 15 extend axially along the inner surface of the bore for receiving the threading of a support screw, not shown. Threading 16 spirals around the outer surface of the anchor all along the proximal end of the anchor, diminishing in crest height from the flange 12 to the plane of joinder between the proximal end and the cutter. Flat band 17 spirals between the crests of the threading and acts to compact the wall material against itself when the anchor is threaded into the wall. The crests of the threading are formed with cutting indentations to assist in the threading of the anchor into the wall. As the anchor is rotated, these indentations actually cut the path of the threading in the wall material.

In accordance with the invention, the cutter tip 20 extends distally from the proximal end and comprises a centering tip 22 to center, that is stabilize, the anchor when it is first inserted in the wall and is rotated and pushed forward. As best seen in FIGS. 1 and 2, the centering tip lies on the axis of the anchor and the wall of the cutter tip diverges proximally in the form of a cone or pointed dome closed on one side, partially closing the through bore at the distal end; opened, however along one side to form a deep outwardly facing concave flute 21, the outer edges of which form the cutting, leading edge 23 and trailing edge 24 of the cutter tip. The cutting edge is angled so as to extend radially outwardly and proximally from the centering tip in a plane in common with the axis of the anchor. This angle sets the edge 23 for effective cutting of the wall material.

The leading edge 23 then diverges from the trailing edge in a mild spiral so that the distance between the edges provides an opening access for material that has been dislodged from the wall by the action of the cutting edge. As previously stated, the flute 21 is in communication with the through bore of the proximal end of the anchor and as seen in FIGS. 1 and 2, extending distally from the through bore to form a distal part of the through bore so that the larger part of the dislodged material will enter the flute and through bore and will not be compacted against the back of the wall.

FIG. 5 discloses a variation of the invention in which the anchor 100 is constructed as described above but instead of a screw fastener being received in the proximal end of the anchor, a screw hook 101 has been screwed in the through bore. Alternatively, the anchor may be secured to the flange 102 of the hook and be the screw portion of the screw hook.

The following claims will define the breadth of invention, not the specific embodiment described above.

What is claimed is:

1. An anchor for inserting into a wall structure comprising a cylindrical body having a center axis, a flanged proximal end, a cutting distal end and a through bore extending along said center axis from said proximal end to said cutting distal end, means at said proximal end for receiving a tool to rotate said anchor about said center axis, an outer thread extending along the outer surface of said cylindrical body, said cylindrical body diminishing in diameter along said cutting distal end and forming a pointed dome with a centering tip disposed at the center axis of said anchor, a single outwardly facing flute defined by outer edges and extending proximally along one side of said distal cutting end radially of said center axis from said pointed tip to and communicating with and forming an extension of said through bore, said through bore being partially closed at said cutting distal end along the side of said distal cutting end radially of said center axis opposite said one side because of the diminishing diameter along said distal cutting end, said outer edges of said flute comprising a leading cutting edge and a trailing edge, said leading cutting edge extending radially and toward said proximal end from said pointed tip and diverging from said trailing edge to provide access to said flute and said through bore for receiving material cut from the wall by said leading cutting edge, said through bore including means extending alone said bore from said proximal end to said flute at said distal cutting end for receiving and being tapped by the threads of a screw fastener, a flange extending radially at said flanged proximal end and said outer thread extending from adjacent said flange to said cutting distal end and comprising means for entering and tapping the wall structure as said anchor is rotated with said tip penetrating the wall structure, said cutting distal end, said flute and said outer thread being positioned relative to one another so as to comprise screw means for tapping the wall structure without drilling a hole in advance of said outer thread, said outer thread having a high turn adjacent said flange at said proximal end, said high turn and said flange comprising means, when embedded in the wall material because of rotation of said wall anchor, for compressing wall material for resisting further distal movement of said anchor when a screw fastener is tapping said means for receiving and for being tapped by the threads of the fastener.

* * * * *